United States Patent [19]

Fukatsu et al.

[11] Patent Number: 5,315,379
[45] Date of Patent: May 24, 1994

[54] APPARATUS FOR THE DEMODULATION OF A CARRIER CHROMINANCE SIGNAL INTO COLOR DIFFERENCE SIGNALS

[75] Inventors: Tsutomu Fukatsu, Kanagawa; Tadayoshi Nakayama, Tokyo; Yoshihiro Nakatani, Kanagawa; Hisataka Hirose, Kanagawa; Chikara Sato, Kanagawa, all of Japan

[73] Assignee: Canon Kasbushiki Kaisha, Tokyo, Japan

[21] Appl. No.: 907,711

[22] Filed: Jul. 2, 1992

Related U.S. Application Data

[62] Division of Ser. No. 518,780, May 4, 1990, abandoned.

[30] Foreign Application Priority Data

| May 15, 1989 | [JP] | Japan | 1-122615 |
| May 15, 1989 | [JP] | Japan | 1-122617 |
| May 15, 1989 | [JP] | Japan | 1-122619 |
| May 15, 1989 | [JP] | Japan | 1-122621 |

[51] Int. Cl.$^5$ .................. H04N 9/64; H04N 9/66
[52] U.S. Cl. .................. 348/713; 348/609; 348/624
[58] Field of Search .................. 358/13, 17, 19, 23, 358/21 R, 40, 36, 37, 11; H04N 9/65, 9/66, 9/64

[56] References Cited

U.S. PATENT DOCUMENTS

| 4,727,361 | 2/1988 | Tokumitsu . | |
| 4,745,463 | 5/1988 | Lu . | |
| 5,063,437 | 11/1991 | Owashi et al. | 358/22 |
| 5,132,785 | 7/1992 | Choi | 358/40 |

Primary Examiner—Mark R. Powell
Assistant Examiner—John W. Miller
Attorney, Agent, or Firm—Robin, Blecker, Daley & Driscoll

[57] ABSTRACT

A color signal processing device for processing a carrier chrominance signal is arranged to produce a first sampling signal by sampling the carrier chrominance signal according to a sampling clock signal synchronized with a reference phase of the carrier chrominance signal and a second sampling signal which is of a sampling phase opposite to that of the first sampling signal and to form baseband signals conforming to a color signal by using the first and second sampling signals. This arrangement enables the device to process the color signal without causing any signal deterioration that tends to result from DC fluctuations of the carrier chrominance signal.

4 Claims, 8 Drawing Sheets (a) CARRIER CHROMINANCE SIGNAL
(b) SEPARATION PULSE (1) HORIZONTAL SYNC PULSE
(2) VERTICAL BLANKING PULSE
(3) MEMORY CONTROL SIGNAL 36

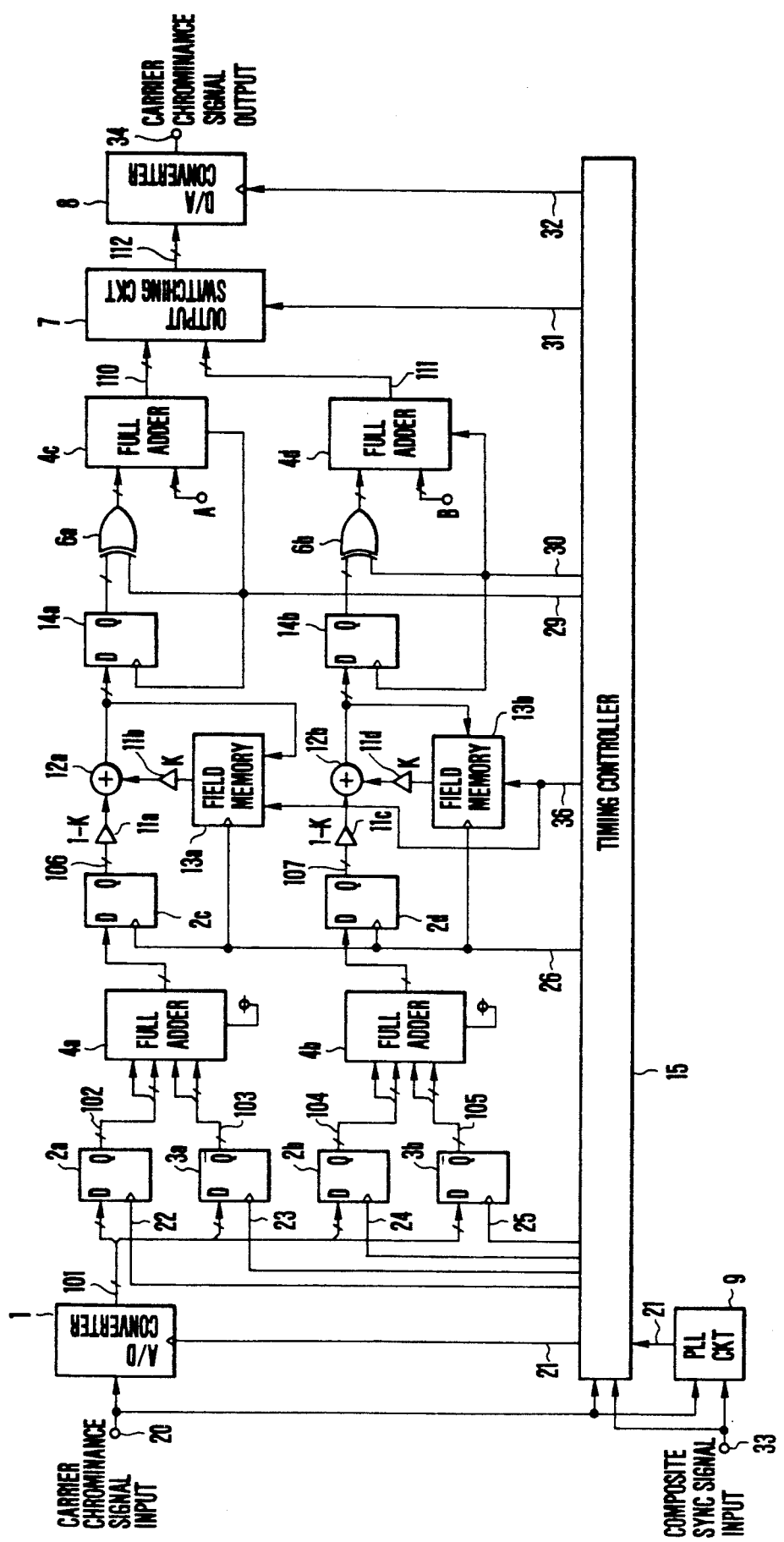

APPARATUS FOR THE DEMODULATION OF A CARRIER CHROMINANCE SIGNAL INTO COLOR DIFFERENCE SIGNALS

This application is a division of application Ser. No. 518,780, filed May 4, 1990, now abandoned.

BACKGROUND OF THE INVENTION

1. Field of the Invention

This invention relates to a color signal processing device arranged to convert a carrier chrominance signal temporarily into color-difference signals and to modulate the color-difference signals back into the carrier chrominance signal after performing various color signal processing actions on the color-difference signals.

2. Description of the Related Art

A digital process is performed on a composite video signal consisting of a luminance signal and a carrier chrominance signal for noise reduction, etc., by using, for example, a field memory, etc. The process can be advantageously carried out by demodulating the luminance and chrominance signals into baseband signals.

In this instance, the composite video signal is demodulated through the following two different processes:

(1) the signal is separated into the luminance signal (hereinafter referred to as Y signal) and the carrier chrominance signal (hereinafter referred to as C signal).

(2) the C signal is demodulated into a color signal.

Through the above-stated process (2), baseband color-difference signals are obtained in a digital signal form in the following manner: two different sampling clock signals which are phase-locked to the color burst signal of the carrier chrominance signal are used for directly analog-to-digital (hereinafter referred to as A/D) converting the carrier chrominance signal.

The above-stated processes are described below in further detail by taking a color TV signal of the NTSC system as an example:

The color TV signal of the NTSC system is first separated into the Y and C signals. The separated C signal is A/D converted according to a sampling clock signal of a frequency which is four times as high as the frequency of the color burst signal. At that instant, if the sampling clock signal is accurately phase-locked to the color burst phases of 0°, 90°, 180° and 270°, sample data sampled at the timing synchronized with the phase of 180° can be regarded as a color-difference signal B-Y and sample data sampled in synchronism with the phase of 270° as a color-difference signal R-Y. Then, the carrier chrominance signal can be demodulated into two different color-difference signals by distributing and separating these sample data according to the clock signal of a subcarrier frequency fsc.

Further, color-difference signal components are modulated into the C signal in the following manner: sample is obtained at a sampling time synchronized with the phase of 0° by inverting the polarity of the sample data obtained at the sampling time synchronized with the phase of 180°. Another sample data is obtained at a sampling time synchronized with the phase of 90° by inverting the polarity of the sample data obtained at the sampling time synchronized with the phase of 270°. Then, the sample data thus obtained are digital-to-analog (hereinafter referred to as D/A) converted in the order of the phases of 180°, 270°, 0° and 90°.

For example, assuming that the sample data which is obtained by A/D converting the C signal at the sampling time synchronized with the phase of 180° is D180, the sampling data D0 which is obtained by inverting the polarity of the sample data obtained at the sampling time synchronized with the phase of 0° can be expressed as follows:

$$D0 = -(D180 - Dce)$$

wherein Dce represents the DC offset value of the C signal.

In a case where the value Dce of the above-stated formula fails to coincide with the center value of the digital data of the C signal, it indicates a phase distortion occurred in the modulated C signal. In that case, color signal deterioration results from variations taking place in hue during the processes of modulation and demodulation. This has presented a problem.

Further, in some cases, a color signal for characters, figures or a title is added to the color-difference signals after the C signal is temporarily converted into the color-difference signals. In such a case, the color represented by the color signal for the characters or the title tends to vary according to phase fluctuations taking place in the sampling clock signal used in forming the color-difference signals from the C signal or in the clock signal used in forming the C signal from the color-difference signals.

Further, the two color-difference signals which are formed in the above-stated manner are sometimes used in obtaining a still picture signal. For this purpose, one-field amount of the two color-difference signals, for example, is stored in a memory. Then, the one-field amount of color-difference signals is repeatedly read out to obtain a still image. In this instance, a skew distortion must be prevented and the carrier chrominance signal must be kept continuous. To meet these requirements, the conventional color signal processing device has necessitated the use of a complex arrangement.

SUMMARY OF THE INVENTION

It is a general object of this invention to provide a color signal processing device which is capable of solving the above-stated problems of the prior art.

It is a more specific object of the invention to provide a color signal processing device which is capable of processing a color signal without any signal deterioration that results from the DC variations of a carrier chrominance signal.

Under this object, a color signal processing device which is arranged as an embodiment of this invention to process a carrier chrominance signal comprises sampling signal producing means arranged to produce a first sampling signal obtained by sampling the carrier chrominance signal on the basis of a sampling clock signal synchronized with a reference phase of the carrier chrominance signal and to produce a second sampling signal formed at a sampling phase opposite to the sampling phase of the first sampling signal; and baseband signal forming means for forming baseband signals conforming to color-difference signals by using the first and second sampling signals produced by the sampling signal producing means.

It is another object of the invention to provide a color signal processing device which is capable of processing a color signal and, after processing, restoring the color signal to the original form of a carrier chrominance signal without causing the signal to be deteriorated by the DC variations of the carrier chrominance signal.

Under this object, a color signal processing device arranged according to this invention to process a carrier chrominance signal comprises sampling signal producing means arranged to produce a first sampling signal obtained by sampling the carrier chrominance signal on the basis of a sampling clock signal synchronized with a reference phase of the carrier chrominance signal and to produce a second sampling signal formed at a sampling phase opposite to the sampling phase of the first sampling signal; baseband signal forming means for forming baseband signals conforming to color-difference signals by using first and second sampling signals produced by the sampling signal producing means; sampling signal forming means for forming a third sampling signal from the baseband signals formed by the baseband signal forming means and a fourth sampling signal of a phase opposite to that of the third sampling signal; and selective output means for selectively outputting the third sampling signal or the fourth sampling signal formed by the sampling signal forming means.

The above and other objects and features of the invention will become apparent from the following detailed description of embodiments thereof taken in conjunction with the accompanying drawings.

BRIEF DESCRIPTION OF THE DRAWINGS

FIG. 5 is a block diagram showing in outline the arrangement of a color signal processing device which is arranged as a third embodiment of the invention.

DETAILED DESCRIPTION OF THE PREFERRED EMBODIMENTS

Figure 1:
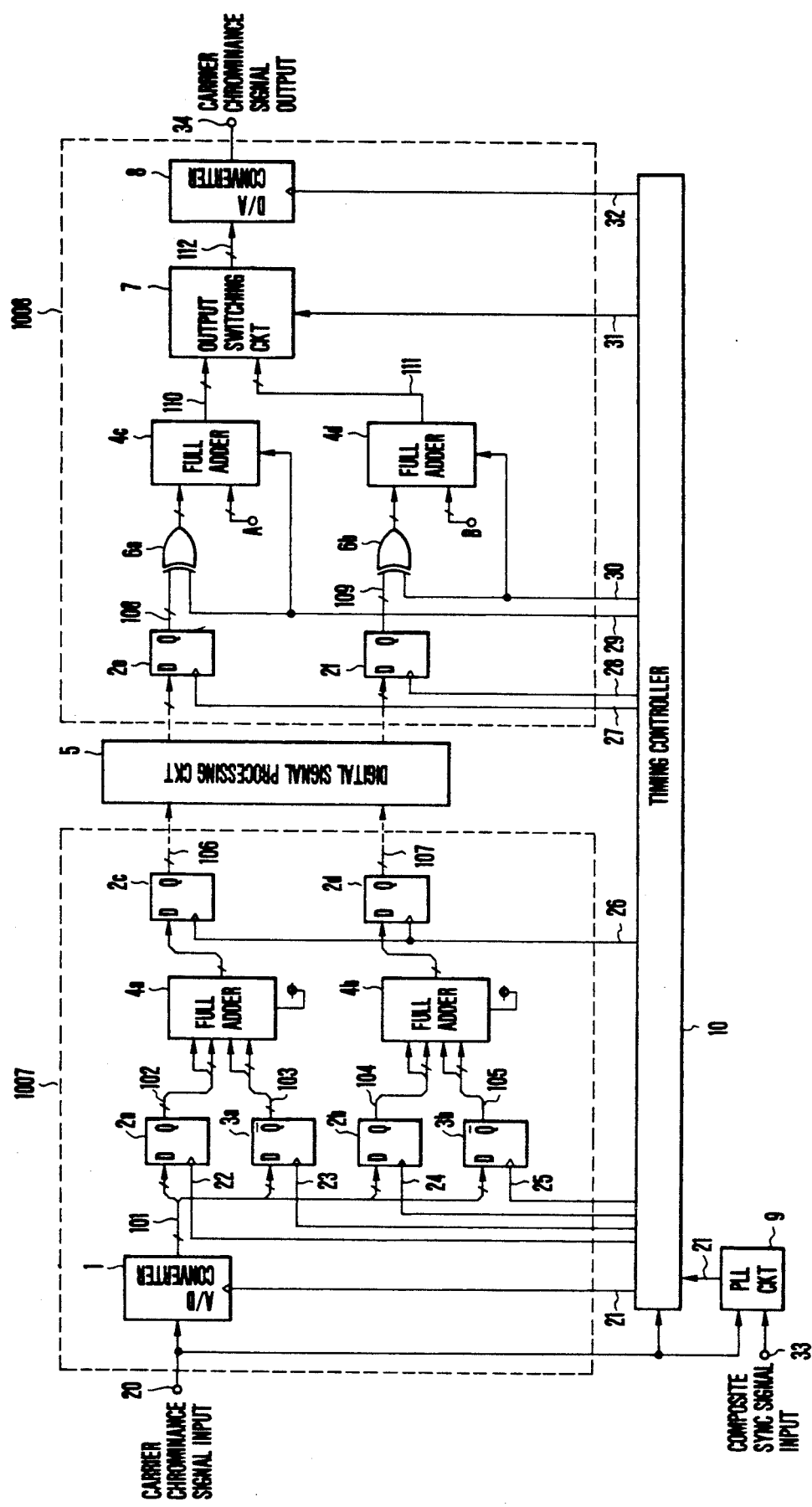
FIG. 1 is a block diagram showing in outline the arrangement of a color signal processing device arranged according to this invention as a first embodiment thereof.
Figure 2:
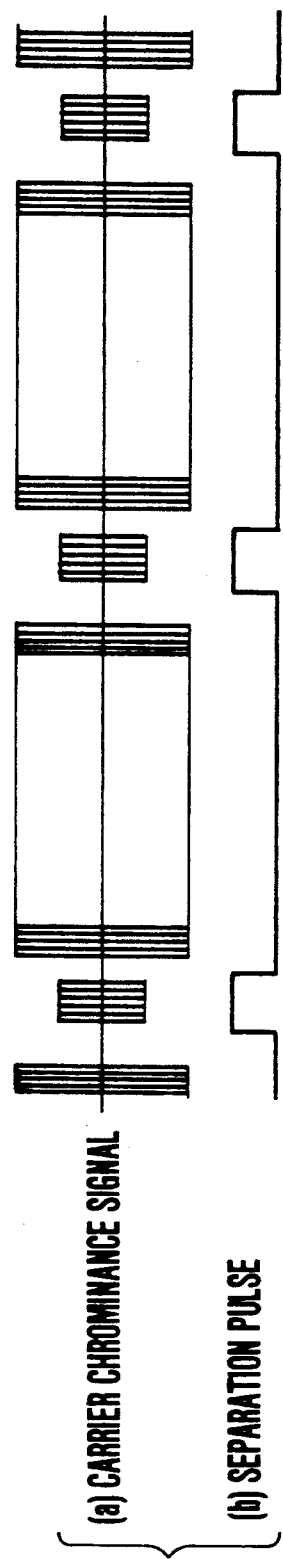
FIGS. 2 and 3 are timing charts showing the operation of the arrangement shown in FIG. 1.
Figure 3:
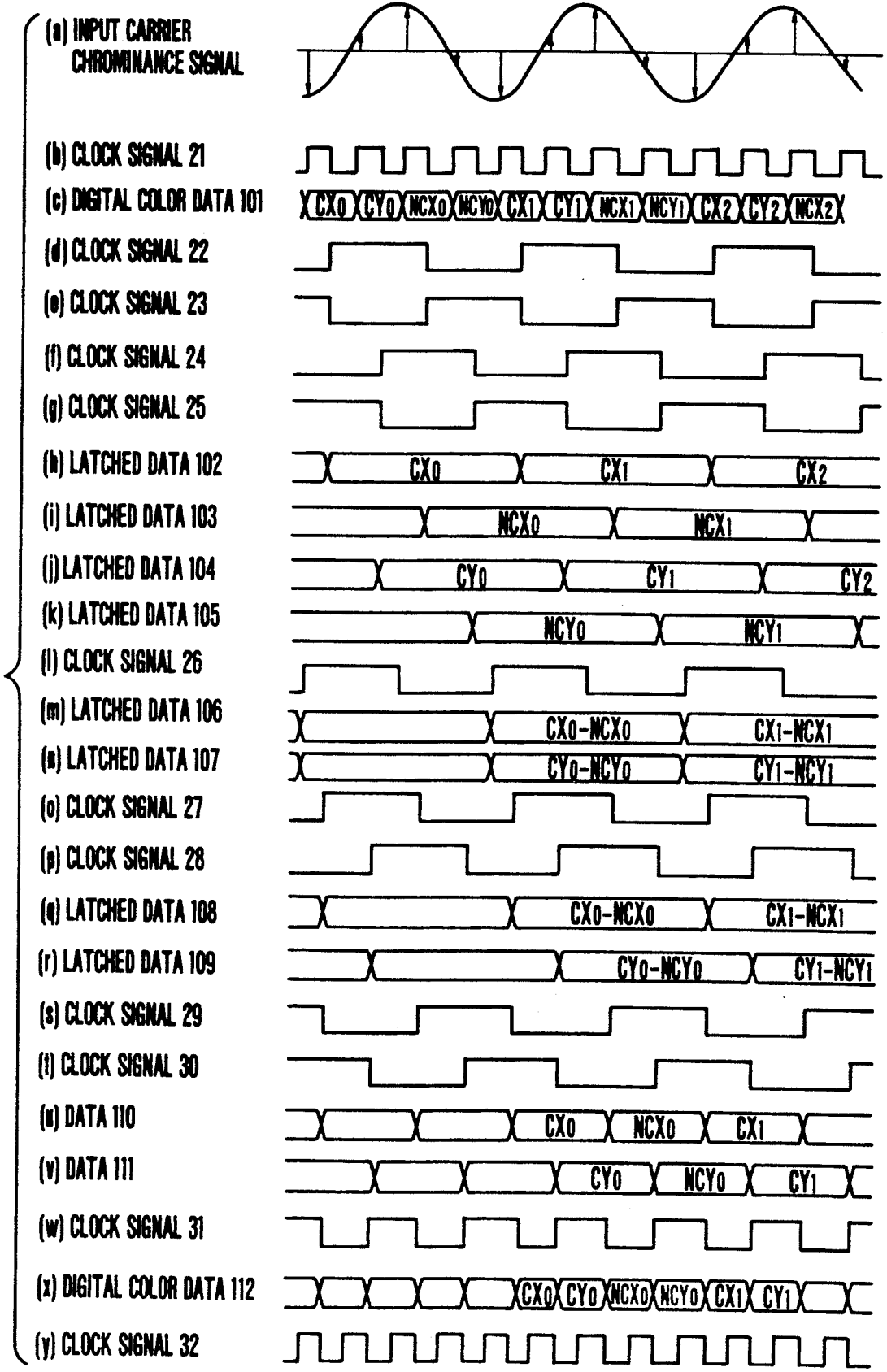

The following describes the details of this invention through some embodiments thereof:

FIG. 1 is a block diagram showing in outline the arrangement of a color signal processing device which is arranged according to this invention as a first embodiment thereof. FIGS. 2 and 3 show in timing charts the operation of the first embodiment shown in FIG. 1.

In FIG. 1, the illustration includes an A/D converter 1; latch circuits 2a to 2f; inverse output latch circuits 3a and 3b; full adders 4a to 4d; a digital signal processing circuit 5 which is arranged to perform a noise reducing process, etc.; exclusive OR gates 6a and 6b; an output switching circuit 7; a D/A converter 8; a PLL (phase-locked loop) circuit 9; and a timing controller 10.

An input terminal 20 is arranged to receive a carrier chrominance signal (C signal) separated from a composite video signal which is, for example, a color TV signal of the NTSC system. An input terminal 33 is arranged to receive a composite synchronizing (hereinafter abbreviated to sync) signal obtained from a sync signal separation circuit or the like which is not shown. An output terminal 34 is arranged to output the C signal.

Referring to FIG. 1, the C signal which is shown at a part (a) of FIG. 3 and is received at the input terminal 20 is supplied to the A/D converter 1, the PLL circuit 9 and the timing controller 10 respectively.

Meanwhile, the composite sync signal is supplied from the input terminal 33 also to the PLL circuit 9. In accordance with the composite sync signal, the PLL circuit 9 forms a separation pulse signal which is shown at a part (b) of FIG. 2 and is arranged to be at a high level only for a period during which a color burst signal is included in the C signal as shown at a part (a) of FIG. 2. The color burst signal is separated from the C signal according to the separation pulse signal. Further, the PLL circuit 9 supplies the timing controller 10 with a clock signal 21 which is phase-locked to the color burst signal separated and has a frequency four times as high as that of the color burst signal as shown at a part (b) of FIG. 3.

The timing controller 10 supplies the A/D converter 1 with the clock signal 21 which is received from the PLL circuit 9. In accordance with this clock signal 21, the A/D converter 1 A/D-converts the C signal to produce digital color data 101 which is shown at a part (c) in FIG. 3. The digital color data 101 output from the A/D converter 1 is supplied to the data input terminals D of the inverse output latch circuits 3a and 3b.

Meanwhile, the timing controller 10 produces four clock signals 22, 23, 24 and 25 which differ in phase from the color burst signal as much as 0°, 90°, 180° and 270° respectively as shown at parts (d), (e), (f) and (g) of FIG. 3. These clock signals 22 to 25 are supplied to the clock input terminals of the latch circuits 2a, 2b, 3a and 3b as shown in FIG. 1. In accordance the clock signals 22 and 24 from the timing controller 10, the latch circuits 2a and 2b latch the digital color data received from the A/D converter 1. The latch circuits 2a and 2b then produce the digital color data, as they are, as latched data 102 and 104 as shown at parts (h) and (j) of FIG. 3. The latched data 102 and 104 are supplied to the full adders 4a and 4b. In accordance with the clock signals 23 and 25 received from the timing controller 10, the latch circuits 3a and 3b latch the digital color data supplied from the A/D converter 1. The latch circuits 3a and 3b then invert the polarity of the digital color data and produce them as latched data 103 and 105 as shown at parts (i) and (k) of FIG. 3. The latched data 103 and 105 are supplied to the full adders 4a and 4b.

The latched data 102 and 103 are added together at the full adder 4a. The latched data 104 and 105 are added together at the full adder 4b. As a result, the full adders 4a and 4b produce difference values between the latched data 102 and 103 and between the latched data 104 and 105 as color-difference demodulation data.

Further, in the case of this embodiment, the digital color data 101 output from the A/D converter 1 is arranged to be used as a complementary number system for "2". This causes the full adders 4a and 4b to perform subtraction processes according to the following formula:

$$DCX_n = CX_n + (\overline{NCX_n} + 1)$$

$$(n = \ldots -1, 0, 1, 2, \ldots)$$

wherein DCXn represents the color-difference demodulation data output from the full adders 4a and 4b; CXn the latched data 102 or 104; and NCXn the latched data 103 or 105 which is of the polarity opposite to that of the latched data CXn. Therefore, the latched data 103 or 105 which is output from the latch circuit 3a or 3b is inverted before it is supplied to the full adder 4a or 4b. Then, the above-stated computing operation is carried out by supplying "1" to an end-around input terminal from a lower place.

Assuming that the latched data CXn and NCXn are expressed as follows:

$$CXn = Vc + VDC \text{ and } NCXn = -Vc + VDC$$

wherein Vc represents the value of the digital color data; and VDC the DC offset value of the digital color data, the color-difference demodulation data DCXn can be expressed as follows and, therefore, the DC offset value of the digital color data can be removed:

$$DCXn = CXn - NCXn = 2 Vc$$

With the DC offset part removed as mentioned above, the color-difference demodulation data are latched by the latch circuits 2c and 2d which perform their latching action in accordance with a latch signal 26 which is output from the timing controller 10 in a manner as shown at a part (1) of FIG. 3. After that, color-difference demodulation data 106 and 107 which are as shown at parts (m) and (n) of FIG. 3 are supplied to the digital signal processing circuit 5.

The digital signal processing circuit 5 temporarily stores the color-difference demodulation data 106 and 107 output from the latch circuits 2c and 2d in a field memory which is disposed within the digital signal processing circuit 5. The circuit 5 performs a noise reducing process on the color-difference demodulation data by utilizing a correlation between the color-difference demodulation data previously stored in the field memory and the color-difference demodulation data newly input thereto. The circuit 5 performs other signal processing actions on the color-difference demodulation data, such as an image enlarging process, an image synthesizing process, etc. Further details of the signal processing operation of the digital signal processing circuit 5 are omitted here.

Next, the color-difference demodulation data which is output from the digital signal processing circuit 5 is modulated into a carrier chrominance signal in the following manner: the two kinds of the color-difference demodulation data which are processed and output from the circuit 5 are supplied respectively to the data input terminals D of the latch circuits 2e and 2f. Then, in accordance with clock signals 27 and 28 which are output from the timing controller 10 at phases differing 90 degrees from each other as shown at parts (o) and (p) of FIG. 3, the latch circuits 2e and 2f latch the color-difference demodulation data. After that, latched data 108 and 109 are produced in a manner as shown at parts (q) and (r) of FIG. 3. The latched data 108 and 109 are supplied to exclusive OR (EXOR) gates 6a and 6b.

Clock signals 29 and 30 which are output from the timing controller 10 at phases opposite to those of the above-stated clock signals 27 and 28 as shown at parts (s) and (t) of FIG. 3 are also supplied to the EXOR gates 6a and 6b respectively. In accordance with these clock signals, the EXOR gates 6a and 6b invert the color-difference demodulation data supplied from the latch circuits 2e and 2f while the clock signals 29 and 30 are at a high level and do not invert them while these clock signals are at a low level. Further, the color-difference demodulation data thus output from the EXOR gates 6a and 6b are respectively supplied to the full adders 4c and 4d. The full adders 4c and 4d receive, from input terminals A and B, data "1" generated by a data generator which is not shown. At the full adders 4c and 4d, the data "1" is added to the colordifference demodulation data when the clock signals 29 and 30 are at a high level and is not added when these clock signals are at a low level.

As a result, the full adders 4c and 4d produce data 110 and 111 each of which alternately has opposite polarities as shown at parts (u) and (v) of FIG. 3. The data 110 and 111 thus output are supplied to the output switching circuit 7.

Then, in synchronism with a clock signal 31 which is output from the timing controller 10 as shown at a part (w) of FIG. 3, the output switching circuit 7 alternately outputs the data 110 and 111 coming from the full adders 4c and 4d. As a result, the output switching circuit 7 outputs digital color data 112 in a state as shown at a part (x) of FIG. 3.

The digital color data 112 output from the output switching circuit 7 is supplied to the D/A converter 8 to be converted into an analog signal in synchronism with a clock signal 32 which is output from the timing controller 10 in a state as shown at a part (y) of FIG. 3. As a result, a carrier chrominance signal is output from the output terminal 34.

As described above, in the case of the first embodiment, the value of a difference between sampling data of the carrier chrominance signal of opposite polarities are arranged to be used as the color-difference demodulation data. This arrangement enables the embodiment to obtain the color-difference demodulation data from the carrier chrominance signal without being affected by any DC offset component generated in the carrier chrominance signal. Then, various digital signal processing actions are performed on the color-difference demodulation data. The data thus processed are converted back into the carrier chrominance signal. Therefore, the signal processing operation can be adequately carried out on the color signal without causing any fluctuations in the hue thereof even in cases where variations take place in the DC component of the carrier chrominance signal.

Figure 4:
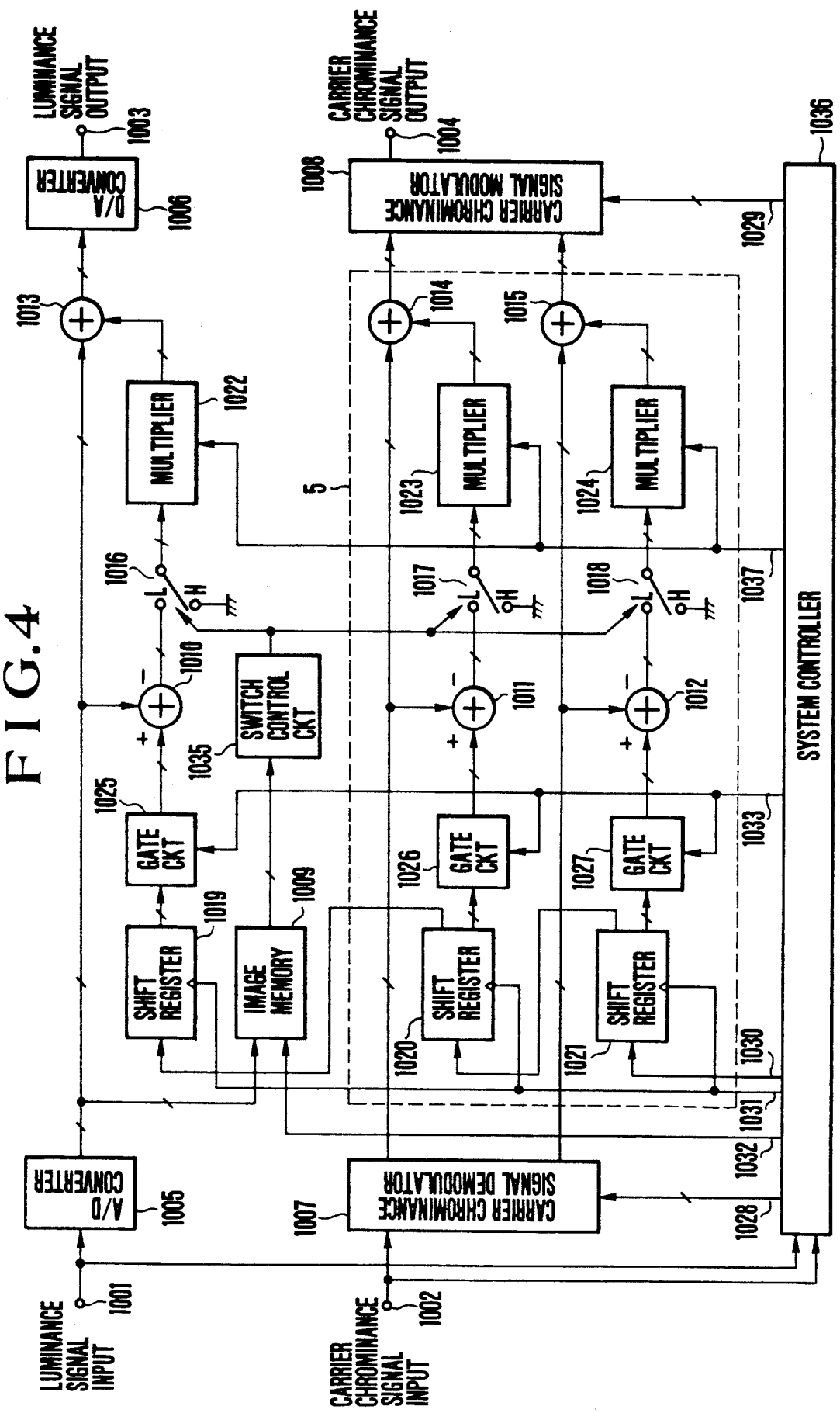
FIG. 4 is a block diagram showing in outline the arrangement of a color signal processing device which is arranged as a second embodiment of the invention.

A second embodiment of this invention is arranged as follows: FIG. 4 is a block diagram showing in outline the arrangement of a color signal processing device which is arranged as a second embodiment of the invention. Referring to FIG. 4, an input terminal 1001 is arranged to receive a luminance signal. An input terminal 1002 is arranged to receive a carrier chrominance signal. An output terminal 1003 is arranged to output a luminance signal. An output terminal 1004 is arranged to output a carrier chrominance signal. The second embodiment comprises an A/D converter 1005; a D/A converter 1006; a carrier chrominance signal demodulator 1007; a carrier chrominance signal modulator 1008; an image memory 1009; subtracters 1010 to 1012; adders 1013 to 1015; change-over switches 1016 to 1018; shift registers 1019 to 1021; multipliers 1022 to 1024; and gate circuits 1025 to 1027. The illustration includes a demodulator control signal 1028; a modulator control signal 1029; title data 1030; a data transfer clock signal 1031; a memory control signal 1032 which is arranged to control writing and reading of image data into and from the image memory 1009; a gate signal 1033; a multiplier control signal 1034; a switch control circuit 1035; a system controller 1036; and multiplier data 1037.

The luminance signal and the carrier chrominance signal are supplied to the input terminals 1001 and 1002 from a video camera or the like. The luminance signal is then supplied to the A/D converter 1005 and the system controller 1031. The carrier chrominance signal is supplied to the carrier chrominance signal demodulator 1007 and the system controller 1036.

At the A/D converter 1005, the luminance signal is converted into digital luminance data and supplies the data to the image memory 1009 which is capable of storing either one-field amount or one-frame amount of the digital luminance data. The digital luminance data is supplied also to the subtracter 1010 and the adder 1013.

The carrier chrominance signal demodulator 1007 is arranged in the same manner as in the case of FIG. 1. At the carrier chrominance signal demodulator 1007, the carrier chrominance signal is demodulated into two kinds of color-difference modulation data through a demodulating action which is performed in the same manner as described in the foregoing. The two color-difference modulation data thus obtained are supplied to the subtracters 1011 and 1012 and the adders 1014 and 1015 respectively.

When the system controller 1036 is instructed by an operation performed on an operation part (not shown) to insert a title picture, the controller 1036 produces and supplies a memory control signal to the image memory 1009 to cause it to begin to store digital luminance data. As a result, one-field or one-frame amount of digital luminance data is stored in the image memory 1009.

Meanwhile, prior to the title image inserting instruction, the system controller 1036 supplies to the shift register 1021 the title data 1030 corresponding to the color of the title image set at the operation part. The shift registers 1019, 1020 and 1021 serially transfer the title data 1030 in synchronism with the transfer clock signal 1031 output from the system controller 1036.

The title data 1030 consists of luminance data and color-difference data of two kinds which are serially arranged to express the color of a title picture set at the operation part which is not shown. Further, the shift registers 1019, 1020 and 1021 are provided with serial ports for serial transfer of the title data 1030 and parallel ports for parallel transfer of the luminance data and the color-difference data of the two kinds. The data output from the parallel ports of the shift registers 1019, 1020 and 1021 are supplied to the gate circuits 1025, 1026 and 1027.

The luminance signal which is received at the input terminal 1001 is supplied to the system controller 1036. The system controller 1036 separates the composite sync signal from the luminance signal; generates a transfer clock signal 1031 during, for example, a vertical blanking period in synchronism with the composite sync signal; and transfers the title data 1030. During the process of transfer of the title data 1030, the system controller 1036 generates a low level gate signal 1033 to bring the gate circuits 1025, 1026 and 1027 into open states. When the luminance data comes to be output from the parallel port of the shift register 1019 and the color-difference data of the two kinds come to be output from the parallel ports of the shift registers 1020 and 1021 after completion of the title data 1030, the system controller 1036 generates a high level gate signal 1033. The high level gate signal 1033 brings the gate circuits 1025, 1026 and 1027 into closed states. As a result, the luminance data from the shift register 1019 is supplied to the plus input terminal of the subtracter 1010. The color-difference data from the shift register 1020 is supplied to the plus input terminal of the subtracter 1011. The color-difference data from the shift register 1021 is supplied to the plus input terminal of the register 1012. The luminance data output from the A/D converter 1005 and the color-difference demodulation data output from the carrier chrominance signal demodulator 1007 are then subtracted from the data output from the shift registers 1019, 1020 and 1021 respectively by the subtracters 1010, 1011 and 1012. The results of subtraction thus obtained are respectively supplied to the change-over switches 1016, 1017 and 1018.

The change-over switches 1016, 1017 and 1018 perform their switching actions under the control of the switch control circuit 1035. The switch control circuit 1035 receives the luminance data read out from the image memory 1009 in synchronism with the vertical sync signal in accordance with an instruction from the system controller 1036. At the switch control circuit 1035, the luminance data thus received is compared with a threshold value which has been set beforehand. If the level of the luminance data is found to be lower than the threshold value, the connecting position of each of the change-over switches 1016, 1017 and 1018 is shifted to one side L. If the level is equal to or higher than the threshold value, the switch position is shifted to the other side H and data indicative of "0" is supplied to each of the multipliers 1022, 1023 and 1024.

Meanwhile, multiplier data K is supplied to each of the multipliers 1022, 1023 and 1024. The multipliers 1022, 1023 and 1024 multiply the data output from the change-over switches 1016, 1017 and 1018 by the value K of the multiplier data. The results of multiplication are supplied to the adders 1013, 1014 and 1015.

The adders 1013, 1014 and 1015 add the data output from the multipliers 1022, 1023 and 1024 to the luminance data output from the A/D converter 1005 and the color-difference demodulation data of the two kinds output from the carrier chrominance signal demodulator 1007 respectively. The luminance data thus output from the adder 1013 is supplied to the D/A converter 1006 to be converted into an analog luminance signal. The analog luminance signal thus obtained is output from the output terminal 1003. The color-difference data of the two kinds which are thus output from the adders 1014 and 1015 are supplied to the carrier chrominance signal modulator 1008, which is arranged in the same manner as in the case of FIG. 1. The color-difference data of the two kinds are modulated into a carrier chrominance signal by a modulating action which is performed in the same manner as described in the foregoing. The carrier chrominance signal thus obtained is output from the output terminal 1004.

The above-stated arrangement enables the second embodiment to form an image signal with a title of a color which is set at the operation part added thereto.

In the second embodiment shown in FIG. 4, the threshold value to be used at the switch control circuit 1035 for comparison with the luminance data output from the image memory 1009 may be arranged to be variable, instead of a fixed value, for example, by operating the operation part. Further, the data supplied to the multipliers 1022, 1023 and 1024 may be arranged to be variable within a range of $0 < K < 1$ by setting the multiplier data supplied to these multipliers within this range by operating the operation part. Such arrangement facilitates display and erasing actions on the title picture, wiping and fading processes, etc.

As described in the foregoing, difference values between the sampling data of the carrier chrominance signal of opposite polarities are used as the color-difference demodulation data. This enables the embodiment to obtain the color-difference demodulation data from the carrier chrominance signal without being affected by any DC offset component that is generated in the carrier chrominance signal. Then, after the color signal corresponding to a title image is added thereto, the color-difference demodulation data can be converted back into the carrier chrominance signal. Therefore, a title picture signal can be added to the color signal without any variations in hue of the title picture signal even in cases where the DC component of the carrier chrominance signal fluctuates.

Figure 6:
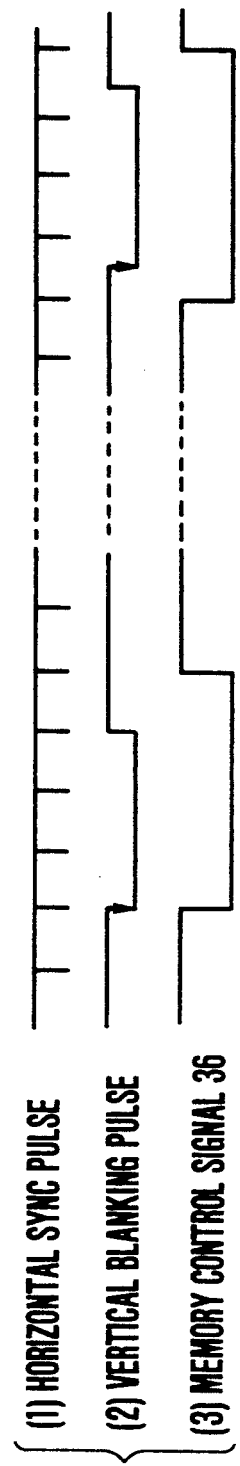
FIGS. 6 and 7 are timing charts showing the operation of the arrangement shown in FIG. 5.
Figure 7:
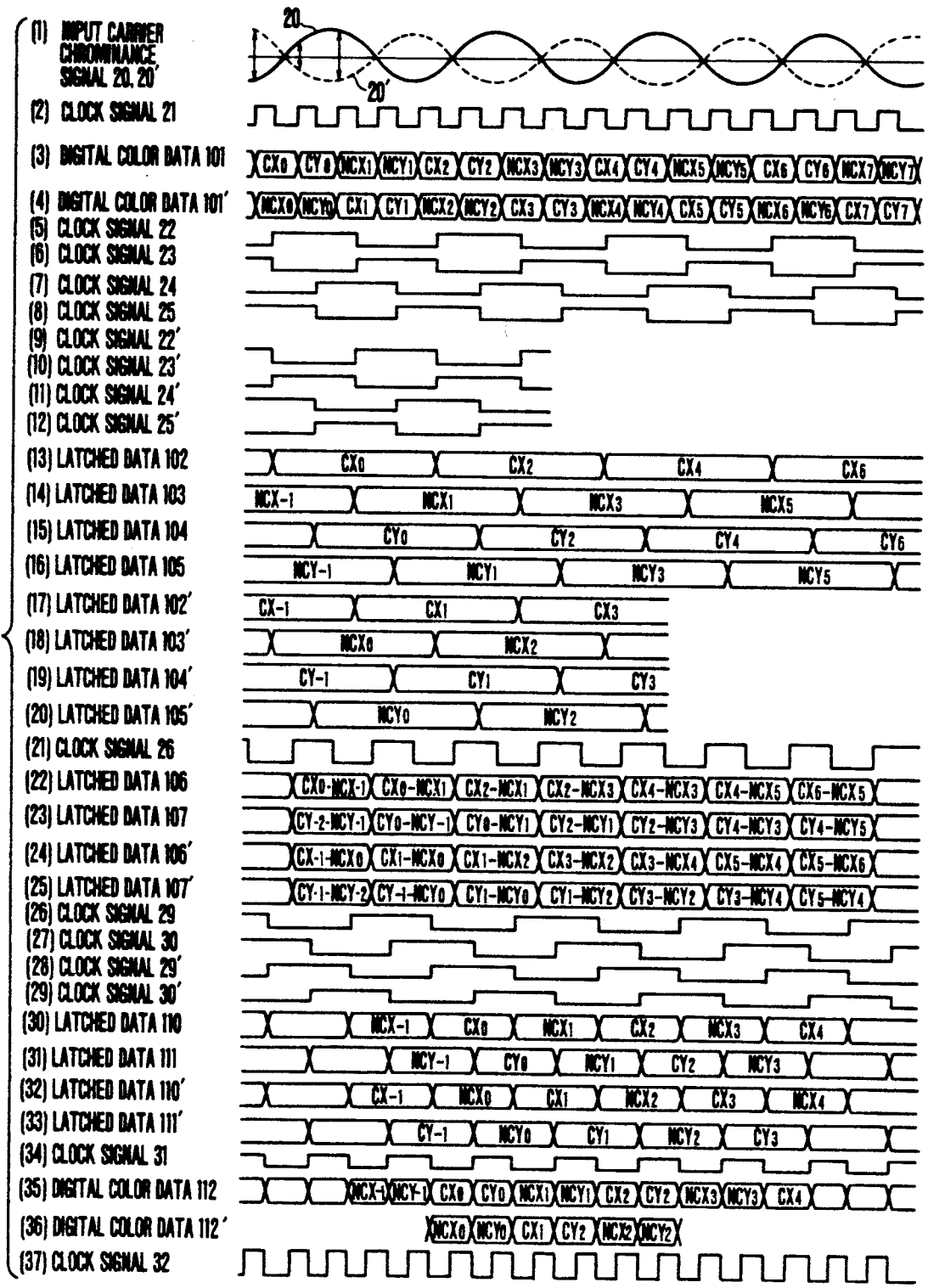

The following describes a third embodiment of this invention: FIG. 5 is a block diagram showing in outline the arrangement of a color signal processing device which is arranged according to the invention as the third embodiment thereof. FIGS. 6 and 7 are timing charts showing the operation of the arrangement shown in FIG. 5. In FIGS. 5 and 7, the parts corresponding to those of FIGS. 1 and 3 are indicated by the same reference numerals.

In FIG. 5, the illustration includes an A/D converter 1; latch circuits 2a to 2d, 14a and 14b; inverse output latch circuits 3a and 3b; full adders 4a to 4d; coefficient multipliers 11a to 11d; adders 12a and 12b; first-in-first-out (FIFO) field memories 13a and 13b; exclusive OR (EXOR) gates 6a and 6b; an output switching circuit 7; a D/A converter 8; a phase-locked loop (PLL) circuit 9; and a timing controller 15.

An input terminal 20 is arranged to receive a C (carrier chrominance) signal separated from a composite video signal such as a color TV signal of the NTSC system. An input terminal 33 is arranged to receive a composite sync signal obtained by means of a sync signal separation circuit or the like which is not shown. An output terminal 34 is arranged to output the C signal.

Referring to FIG. 5, the C signal which is received at the input terminal 20 and is shown at a part (1) of FIG. 3 is supplied to the A/D converter 1, the PLL circuit 9 and the timing controller 15.

At the part (1) of FIG. 7, a full line represents, for example, the carrier chrominance signal 20 of an odd-number field. A broken line represents the carrier chrominance signal 20' of an even-number field. After the part (1) of FIG. 7, signals corresponding to the carrier chrominance signal 20 are indicated by reference numerals 101, 22, etc. while signals corresponding to the other carrier chrominance signal 20' are indicated by reference numerals 101', 22', etc. The details of the timing chart of FIG. 7 are omitted from the following description.

The composite sync signal received at the input terminal 33 is supplied to the PLL circuit 9. In accordance with this sync signal, the PLL circuit 9 forms a separation pulse signal which is shown at the part (b) of FIG. 2 and is at a high level only for a period during which a color burst signal is added to the C signal which is shown at the part (a) of FIG. 2. The PLL circuit 9 separates color burst signal from the C signal in accordance with this separation pulse signal. Further, the PLL circuit 9 supplies the timing controller 15 with a clock signal 21 of a frequency which is four times as high as the frequency of the color burst signal as shown at a part (2) of FIG. 7.

The timing controller 15 receives the clock signal 21 from the PLL circuit 9 and supplies it to the A/D converter 1. In accordance with the clock signal 21 supplied from the timing controller 15, the A/D converter 1 A/D-converts the C signal into digital color data 101 which is shown at a part (3) of FIG. 7.

The digital color data 101 output from the A/D converter 1 is supplied to the data input terminals D of the latch circuits 2a and 2b and those of the inverse output latch circuits 3a and 3b. Meanwhile, the timing controller 15 produces four other clock signals 22, 23, 24 and 25 which differ in phase from the color burst signal of the C signal as much as 0°, 90°, 180° and 270° as shown at parts (5), (6), (7) and (8) of FIG. 7. These clock signals 22 to 25 are supplied to the clock input terminals of the latch circuits 2a, 2b, 3a and 3b as shown in FIG. 5. In accordance with the clock signals 22 and 24 coming from the timing controller 15, the latch circuits 2a and 2b latch the digital color data supplied from the A/D converter 1 and then produce them, as they are, as latched data 102 and 104 as shown at parts (13) and (15) of FIG. 7. The latched data 102 and 104 are supplied to the full adders 4a and 4b. Further, in accordance with the clock signals 23 and 25 supplied from the timing controller 15, the latch circuits 3a and 3b latch the digital color data supplied from the A/D converter 1 and produce them by inverting their polarity as latched data 103 and 105 as shown at parts (14) and (16) of FIG. 7. These latched data 103 and 105 are supplied also to the full adders 4a and 4b.

Upon receipt of the latched data from the latch circuits 2a, 2b, 3a and 3b, the full adders 4a and 4b add the latched data 102 and 103 together and the latched data 104 and 105 together respectively. As a result, difference values between the latched data 102 and 103 and between the latched data 104 and 105 are output from the full adders 4a and 4b as color-difference demodulation data.

Further, the digital color data 101 which is output from the A/D converter 1 is used as a complement system for "2". Then, the subtracting process to be performed at the full adders 4a and 4b can be expressed as follows:

$$DCXn = CXn + (\overline{NCXn} + 1)$$

$$(n = \ldots -1, 0, 1, 2, \ldots)$$

wherein DCXn represents the color-difference demodulation data output from the full adder 4a or 4b; CXn the latched data 102 or 104; and NCXn the latched data 103 or 105 which is of the polarity opposite to that of the CXn.

Therefore, with the latched data 103 and 105 output from the latch circuit 3a and 3b inverted and supplied to the full adders 4a and 4b, the computing operation of the above-stated formula is carried out by supplying "1" to each of end-around input terminals from a lower place.

Assuming that the latched data CXn and NCXn are expressed as $$CXn = Vc + VDC \quad NCXn = -Vc + VDC$$

(wherein Vc represents the value of the digital color data; and VDC the DC offset value of the digital color data), the color-difference demodulation data DCXn can be expressed as: DCXn = CXn − NCXn = 2 Vc Therefore, the DC offset value of the digital color data can be removed.

With the DC offset component thus removed, the color-difference demodulation data are supplied to and latched by the latch circuits 2c and 2d which are arranged to perform a latching action in accordance with a latch signal 26 which is output from the timing controller 15 in a manner as shown at a part (21) of FIG. 7. The latched color-difference demodulation data 106 and 107 which are as shown at parts (22) and (23) of FIG. 7 are supplied to the coefficient multipliers 11a and 11c.

In the arrangement shown in FIG. 5, the coefficient multipliers 11a to 11d, the adders 12a and 12b and the field memories 13a and 13b jointly form a primary IIR (infinity impulse response) filter which utilizes the correlation between fields. At the coefficient multipliers 11a and 11c, the color-difference demodulation data are multiplied by a coefficient (1 − K). At the multipliers 11b and 11d, the color-difference demodulation data which belong to an immediately preceding field and read out from the field memories 13a and 13b are 12b, these color-difference demodulation data are added together respectively to have their noise components removed. After removal of the noise components, the outputs of these adders 12a and 12b are supplied to the latch circuits 14a and 14b and also to the field memories 13a and 13b.

In the case of a color TV signal of the NTSC system, the phase of the carrier chrominance signal is inverted for every field period. Therefore, if the signal is sampled according to the sampling clock signal of one and the same phase for both the odd- and even-number fields, sampling points obtained during the odd-number field period fail to be vertically aligned on a picture plane with sampling points obtained during the even-number field period. With sampling data sampled in such a manner, if the noise removing operation is performed by utilizing the correlatively between the sampling data stored in the field memory for an immediately preceding field and the sampling data newly obtained for the current field, the correlatively between the new sampling data and the stored sampling data becomes weak in the vertical direction. This tends to deteriorate the resolution of the signal obtained after noise removal.

This embodiment of the invention is arranged to solve the above-stated problem in the following manner: among adjacent sampling points within each field, the value of a difference between sample points of opposite phases is obtained. The difference value thus obtained is used as color-difference demodulation data. The noise removing operation is performed by utilizing the correlatively between the color-difference demodulation data of one field and that of the other field. This arrangement effectively prevents the deterioration of resolution of the signal after noise removal.

More specifically, in accordance with the arrangement of this (third) embodiment, the horizontal and vertical positions of the color-difference demodulation data within one field picture plane are the same as those of another field. Therefore, the noise removing operation can be accomplished, without lowering the resolution, by using the field memory, etc., to utilize the correlatively.

Further, in the third embodiment shown in FIG. 5, the timing controller 15 supplies a memory control signal 36 to the field memories 13a and 13b.

The timing controller 15 receives a composite sync signal which is supplied to the input terminal 33. At the timing controller 15, a horizontal sync pulse signal and a vertical blanking pulse signal are separated as shown at parts (1) and (2) of FIG. 6. The above-stated memory control signal 36 is formed in synchronism with the horizontal sync pulse signal in such a way as to be at a low level for a period of 4 H (H: horizontal sync period) which includes one vertical blanking pulse as shown at a part (3) of FIG. 6. Writing and reading into and from the field memories 13a and 13b are inhibited for a period during which the memory control signal 36 is at a low level.

The writing and reading actions on the field memories are thus controlled by the memory control signal 36 in such a way as to have the color-difference demodulation data newly obtained and the color-difference demodulation data read out from the field memories 13a and 13b to coincide with each other on the field picture plane. In addition to that, the field memories 13a and 13b are arranged to store a fixed amount of color-difference demodulation data, so that the arrangement of the embodiment can be simplified.

After noise removal, the color-difference demodulation data is modulated into a carrier chrominance signal in the following manner:

Referring again to FIG. 5, the color-difference demodulation data of two kinds which are output from the adders 12a and 12b are supplied respectively to the data input terminals D of the latch circuits 14a and 14b. The latch circuits 14a and 14b latch these data inputs in accordance with clock signals 29 and 30 which are output from the timing controller 15 at phases differing 90 degrees from each other as shown at parts (26) and (27) of FIG. 7. The latched color-difference demodulation data are supplied to the exclusive OR (EXOR) gates 6a and 6b respectively.

The EXOR gates 6a and 6b receive also the clock signals 29 and 30 from the timing controller 15. At the EXOR gates 6a and 6b, the polarity of the color-difference demodulation data supplied from the latch circuits 14a and 14b is inverted by the clock signals 29 and 30 while these clock signals are at a high level (not inverted while they are at a low level). The color-difference demodulation data thus processed by the EXOR gates 6a and 6b are supplied to the full adders 4c and 4d. At the full adders 4c and 4d, data "1" generated by a data generator which is not shown is added to these color-difference demodulation data also in accordance with the clock signals 29 and 30 while these clock signals are at a high level (not added while they are at a low level).

As a result, data 110 and 111 which are shown at parts (30) and (31) of FIG. 7 are output from the full adders 4c and 4d. These data 110 and 111 are allowed to be alternately output through the output switching circuit 7 in synchronism with a clock signal 31 which is output from the timing controller 15 as shown at a part (34) of FIG. 7. The output switching circuit 7 thus outputs a digital color data 112 which is shown at a part (35) of FIG. 7.

The digital color data output from the output switching circuit 7 is supplied to the D/A converter 8. At the D/A converter 8, the digital color data is converted into an analog signal according to a clock signal 32 which is output from the timing controller 15 as shown at a part (37) of FIG. 7. As a result, a carrier chrominance signal is output from the output terminal 34.

As mentioned above, the difference values of sampling data of the carrier chrominance signal having opposite polarities are used as the color-difference demodulation data. This enables the embodiment to obtain the color-difference demodulation data from the carrier chrominance signal without being affected by any DC offset component generated in the carrier chrominance signal. Then, the noise removing process is performed on the color-difference demodulation data by utilizing the correlatively of these data. After noise removal, the data are converted back into the carrier chrominance signal. The arrangement thus enables the embodiment to perform the noise removing operation on the color signal without causing any change in the hue thereof even in the event of occurrence of fluctuations in the DC component of the carrier chrominance signal.

Figure 8:
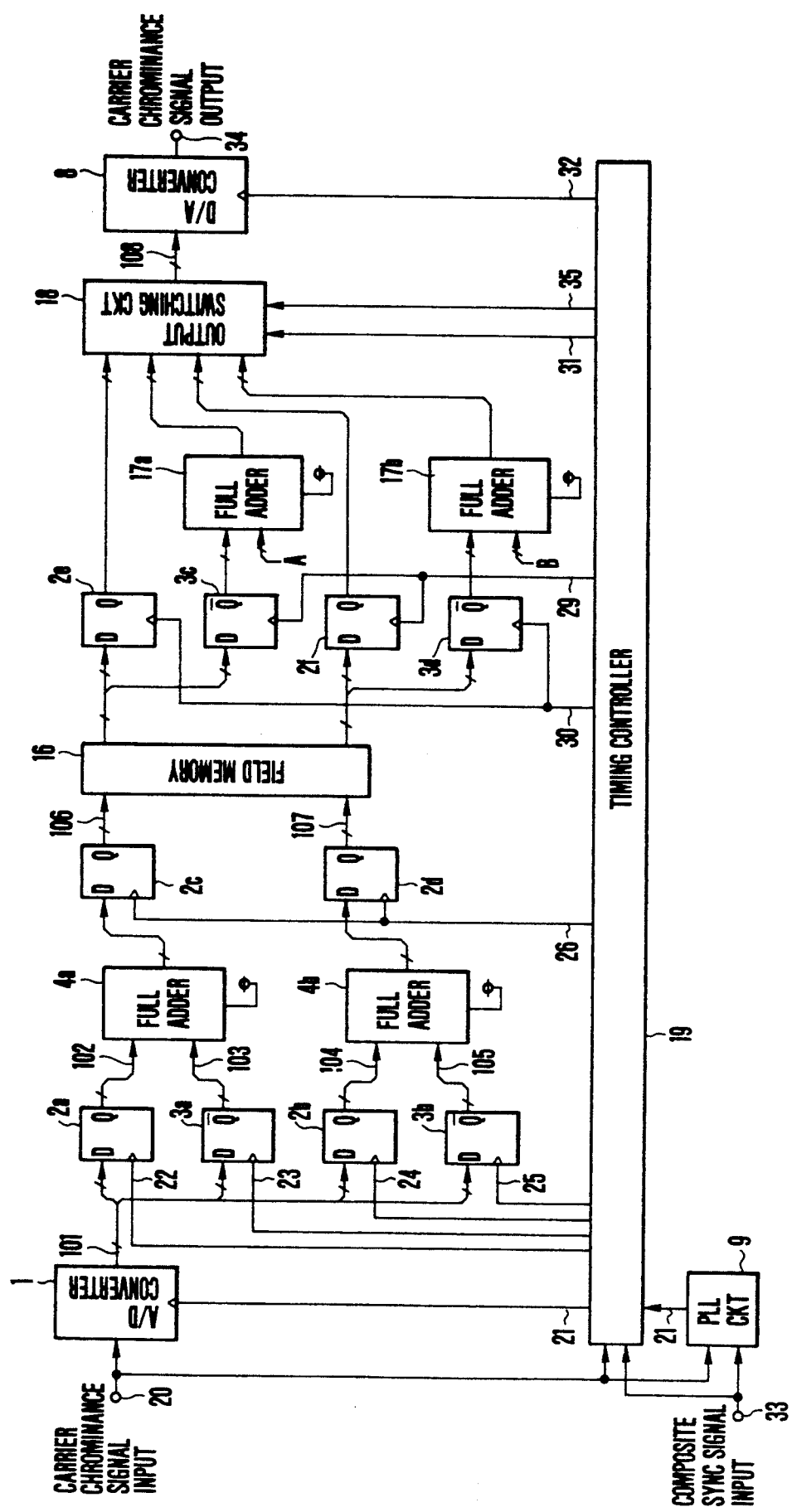
FIG. 8 is a block diagram showing in outline the arrangement of a color signal processing device arranged as a fourth embodiment of the invention.
Figure 9:
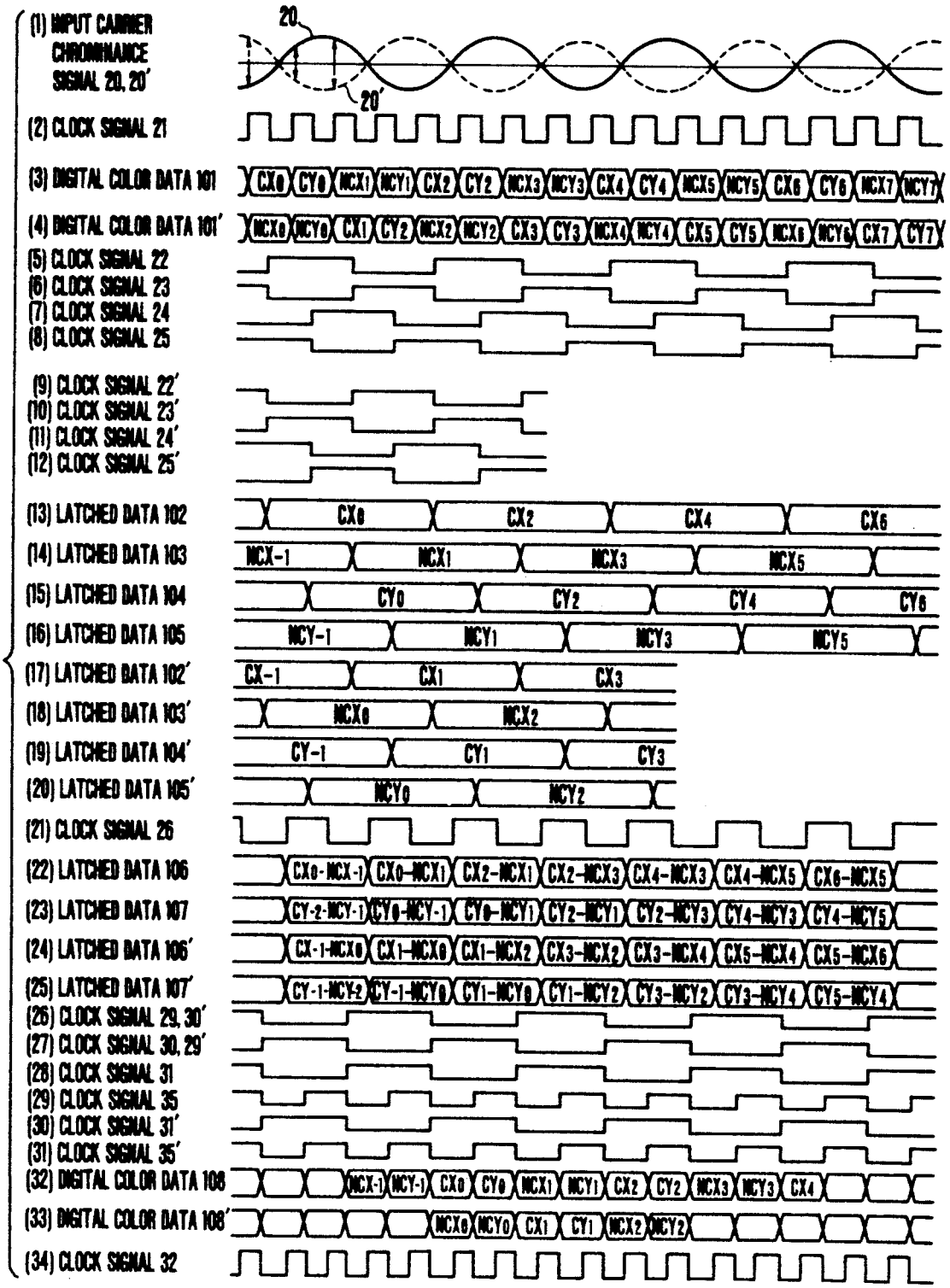
FIG. 9 is a timing chart showing the operation of the arrangement shown in FIG. 8.

The following describes a fourth embodiment of the invention: FIG. 8 is a block diagram showing in outline the arrangement of a color signal processing device arranged as the fourth embodiment of the invention. FIG. 9 is a timing chart showing the operation of the arrangement shown in FIG. 8. In FIGS. 8 and 9, the same parts as those of FIGS. 1 and 3 are indicated by the same reference numerals.

Referring to FIG. 8, the illustration includes an A/D converter 1; latch circuits 2a to 2f; inverse output latch circuits 3a to 3d; full adders 4a, 4b, 17a and 17b; a field memory 16, an output switching circuit 18; a D/A converter 8; a phase-locked loop (PLL) circuit 9; and a timing controller 19.

An input terminal 20 is arranged to receive a C signal separated from a composite video signal which is, for example, a color TV signal of the NTSC system. An input terminal 33 is arranged to receive a composite sync signal obtained by a sync signal separation circuit which is not shown. An output terminal 34 is arranged to output the C signal.

The C signal which is supplied to the input terminal 20 and is shown at a part (1) of FIG. 9 is supplied to the A/D converter 1, the PLL circuit 9 and the timing controller 19.

In the part (1) of FIG. 9, a full line represents, for example, a carrier chrominance signal 20 of an odd-number field. A broken line represents a carrier chrominance signal 20' of an even number field. In the ensuing parts of FIG. 9, signals corresponding to the carrier chrominance signal 20 are indicated by reference numerals 101, 22, etc. Signals corresponding to the carrier chrominance signal 20' are indicated by reference numerals 101', 22', etc. The details of these signals are omitted from the following description.

The composite sync signal which is received at the input terminal 33 is supplied to the PLL circuit 9. In accordance with the composite sync signal, the PLL circuit 9 forms a separation pulse signal which is shown at the part (b) of FIG. 2 and is at a high level only while a color burst signal is included in the C signal which is shown at the part (a) of FIG. 2. Then, in accordance with this separation pulse signal, the color burst signal is separated from the C signal. Further, the PLL circuit 9 supplies the timing controller 19 with a clock signal 21 which is of a frequency four times as high as the frequency of the separated color burst signal and is phase-locked to the color burst signal as shown at a part (2) of FIG. 9.

The timing controller 19 supplies the A/D converter 1 with the clock signal 21 which is received from the PLL circuit 9. Then, in accordance with the clock signal 21 from the timing controller 19, the A/D converter 1 A/D-converts the C signal and produces a digital color data 101 which is shown at a part (3) of FIG. 9.

The digital color data output from the A/D converter 1 is supplied to the data input terminals D of the latch circuits 2a and 2b and also to those of the inverse output latch circuits 3a and 3b.

Meanwhile, the timing controller 19 produces four clock signals 22, 23, 24 and 25 which differ in phase from the color burst signal of the C signal by 0°, 90°, 180° and 270° respectively as shown at parts (5), (6), (7) and (8) of FIG. 9. Then, as shown in FIG. 8, these clock signals 22 to 25 are supplied to the clock input terminals of the latch circuits 2a, 2b, 3a and 3b. In timing controller 19, the latch circuits 2a and 2b latch the digital color data supplied from the A/D converter 1 and then produce these inputs as they are and as latched data 102 and 104 as shown at parts (13) and (15) of FIG. 9. The latched data 102 and 104 are supplied to the full adders 4a and 4b. Further, in accordance with other clock signals 23 and 25 from the timing controller 19, the latch circuits 3a and 3b latch the digital color data received from the A/D converter 1. Then, the latch circuits 3a and 3b invert the polarity of these inputs and produce them as latched data 103 and 105 as shown at parts (14) and (16) of FIG. 9. The latched data 103 and 105 are supplied also to the full adders 4a and 4b.

At the full adder 4a, the latched data 102 and 103 supplied from the latch circuits 2a and 3a are added together. At the other full adder 4b, the latched data 104 and 105 supplied from the latch circuits 2b and 3b are added together. A difference value between the latched data 102 and 103 and a difference value between the latched data 104 and 105 are thus obtained and output as color-difference modulation data from the full adders 4a and 4b.

In the case of this (fourth) embodiment, the digital color data 101 output from the A/D converter 1 is used as a complement system for "2". The full adders 4a and 4b then perform their subtracting process in accordance with the following formula:

$$DCXn = CXn + (\overline{NCXn} + 1)$$

$$(n = \ldots -1, 0, 1, 2, \ldots)$$

wherein DCXn represents the color-difference demodulation data output from the full adder 4a or 4b; CXn the latched data 102 or 104; and NCXn the latched data 103 or 105 of the polarity which is opposite to that of the latched data CXn. Therefore, the latched data 103 and 105 output from the latch circuits 3a and 3b are inverted before they are supplied to the full adders 4a and 4b. Then, a computing operation is carried out according to the above-stated formula by supplying "1" to a terminal for end-around input from a lower place of the data.

Assuming that the latched data CXn and NCXn are expressed as $$CXn = Vc + VDC \quad NCXn = -Vc + VDC$$

(wherein Vc represents the value of the digital color data and VDC the DC offset value of the digital color data), the color-difference demodulation data DCXn can be expressed as: DCXn = CXn − NCXn = 2 Vc. Therefore, the DC offset value can be removed from the digital color data.

With the DC offset component thus removed, the color-difference demodulation data are supplied to and latched by the latch circuits 2c and 2d which perform their latching actions in accordance with a latch signal 26 which is output from the timing controller 19 as shown at a part (21) of FIG. 9. The latch circuits 2c and 2d then produce color-difference demodulation data 106 and 107 which are shown at parts (22) and (23) of FIG. 9. The data 106 and 107 are supplied to the field memory 16.

One-field amount of each of the two color-difference demodulation data output from the latch circuits 2c and 2d is stored by the field memory 16. In the case of this embodiment, the one-field amounts of two colordifference demodulation data stored in the field memory 16 is arranged to be repeatedly read out for forming a carrier chrominance signal in such a way as to obtain a still image signal without much signal deterioration despite of a simple arrangement of the embodiment as will be further described below.

The details of operation to read out the color-difference demodulation data from the field memory 16 and to modulate the data into a carrier chrominance signal are as follows: referring to FIG. 8, the color-difference demodulation data read out from the field memory 16 are respectively supplied to the data input terminals D of the latch circuits 2e and 2f and those of the inverse output latch circuits 3c and 3d. Meanwhile, the timing controller 19 supplies the latch circuits 2e and 2f with a clock signal 29 which is shown at a part (26) of FIG. 9 and the inverse output latch circuits 3c and 3d with another clock signal the phase of which differs 180 degrees from that of the clock signal 29 as shown at a part (27) of FIG. 9. In accordance with these clock signals 29 and 30, the latch circuits 2e, 2f, 3c and 3d latch the color-difference demodulation data. The latched color-difference demodulation data are supplied to the output switching circuit 18 and the full adders 17a and 17b.

The color-difference demodulation data supplied to the full adders 17a and 17b are obtained by inverting the color-difference demodulation data read out from the field memory 16 through the inverse output latch circuits 3c and 3d as mentioned above. At the full adders 17a and 17b, data "1" which is produced by a data generator (not shown) and is supplied through terminals A and B is added to the color-difference demodulation data respectively.

The output switching circuit 18 receives the color-difference demodulation data of four kinds which are output from the latch circuits 2e and 2f and the full adders 17a and 17b. At the output switching circuit 18, these input data are serially output one after another in synchronism with clock signals 31 and 35 which are output from the timing controller 19 as shown at parts (28) and (29) of FIG. 9. By this, a digital color data 108 which is shown at a part (32) of FIG. 9 is output from the switching circuit 18.

The digital color data 108 which is thus obtained is supplied to the D/A converter 8. Then, in synchronism with a clock signal 32 which is output from the timing controller 19 as shown at a part (34) of FIG. 9, the D/A converter 8 converts the digital color data 108 into an analog signal. As a result, a carrier chrominance signal is output from the output terminal 34.

As described above, one-field amount of the color-difference demodulation data stored in the field memory 16 is repeatedly read out. In forming the carrier chrominance signal from the color-difference demodulation data thus read out, various clock signals are output from the timing controller 19. The clock signals 29, 30, 31 and 32 which are shown at parts (26), (27), (28) and (29) of FIG. 9 are used, for example, for an odd-number field. Clock signals 29', 30', 31' and 32' which are shown at parts (26), (27), (30) and (31) of FIG. 9 are used for an even-number field. In outputting the digital color data, the output switching circuit 18 alternately outputs, for every field period, the data 108 which is shown at the part (32) of FIG. 9 and the data 108' which is shown at the part (33) of FIG. 9. A chroma inverting process is thus carried out.

As described in the foregoing, in accordance with this invention, difference values between the sampling data of carrier chrominance signal of opposite polarities are arranged to be employed as the color-difference demodulation data. By virtue of this arrangement, the color-difference demodulation data are obtained from the carrier chrominance signal without being affected by any DC offset component generated within the carrier chrominance signal. After that, one-field amount of the colordifference demodulation data are temporarily stored. The stored color-difference demodulation data are then repeatedly read out for converting them back into the carrier chrominance signal. A chroma inverting process can be easily carried out in converting the color-difference demodulation data back into the carrier chrominance signal by repeatedly reading out the data stored.

What is claimed is:

1. A digital color signal processing device for digital-processing a carrier chrominance signal, comprising:
    (A) sampling clock signal producing means for producing first, second, third and fourth sampling clock signals, which have a frequency equal to that of the color burst signals of the carrier chrominance signal and have phases which differ by 90 degrees from each other, respectively, on the basis of the color burst signal contained in the received carrier chrominance signal;
    (B) sampling means for sampling the received carrier chrominance signal in accordance with the first, second, third and fourth sampling clock signals produced by said sampling clock signal producing means, thereby forming sampling data; and
    (C) subtracting means for effecting subtraction of the sampling data formed in accordance with said first sampling clock signal and the sampling data formed in accordance with the second sampling clock signal, thereby outputting a first baseband signal conforming to a first color-difference signal and effecting subtraction of the sampling data formed in accordance with the third sampling clock signal and the sampling data formed in accordance with the fourth sampling clock signal, thereby outputting a second baseband signal conforming to a second color-difference signal.

2. A device according to claim 1, wherein said subtraction means is arranged to output the first baseband signal conforming to the first color-difference signal by inverting the polarity of the sampling data formed in accordance with the second sampling clock signal and then adding the inverted sampling data to the sampling data formed in accordance with the first sampling clock signal, and to output the second baseband signal conforming to the second color-difference signal by inverting the polarity of the fourth sampling clock signal and then adding the inverted sampling data to the sampling data formed in accordance with the third sampling clock signal.

3. A device according to claim 1, wherein said digital color signal processing device further comprises multiplexing means for multiplexing the second baseband signal outputted from said subtraction means with the first baseband signal outputted from said subtractions means.

4. A device according to claim 1, wherein said digital color signal processing device further comprises noise removing means for effecting a noise removing process on the first and second baseband signals outputted from said subtraction means.

* * * * *

UNITED STATES PATENT AND TRADEMARK OFFICE
CERTIFICATE OF CORRECTION

PATENT NO. : 5,315,379
DATED : May 24, 1994
INVENTOR(S) : Tsutomo Fukatsu, et al.

It is certified that error appears in the above-indentified patent and that said Letters Patent is hereby corrected as shown below:

```
Col.  1, line 59, after "sample" insert --data--
Col.  4, line 37, after "accordance" insert --with--
Col.  6, line  9, change "colordifference" to --color-difference--
Col. 11, line 27, after "are" insert --multiplied by a coefficient
                  K. At the address 12 a and--
Col. 14, line 20, after "In" insert --accordance with the clock
                  signals 22 and 24 from the--
Col. 15, line 20, change "colordifference" to --color-difference--
Col. 15, line 25, delete "of"
Col. 16, line 29, change "colordifference" to --color-difference--
Col. 16, line 66, change "traction" to --tracting--
Col. 18, line 2, 3, 10, change "subtraction" to --subtracting--
```

Signed and Sealed this

Eleventh Day of October, 1994

Attest:

BRUCE LEHMAN

Attesting Officer

Commissioner of Patents and Trademarks